March 2, 1965

L. E. BARNES 3,171,291

MECHANICAL AMPLIFIER

Filed Aug. 17, 1962

INVENTOR.
LELL E. BARNES
BY
*William V. Ebs*
HIS ATTORNEY

March 2, 1965

L. E. BARNES 3,171,291

MECHANICAL AMPLIFIER

Filed Aug. 17, 1962

INVENTOR.
LELL E. BARNES
BY
William V. Eba
HIS ATTORNEY

March 2, 1965

L. E. BARNES 3,171,291

MECHANICAL AMPLIFIER

Filed Aug. 17, 1962

INVENTOR.
LELL E. BARNES
BY
William V. Ebs
HIS ATTORNEY

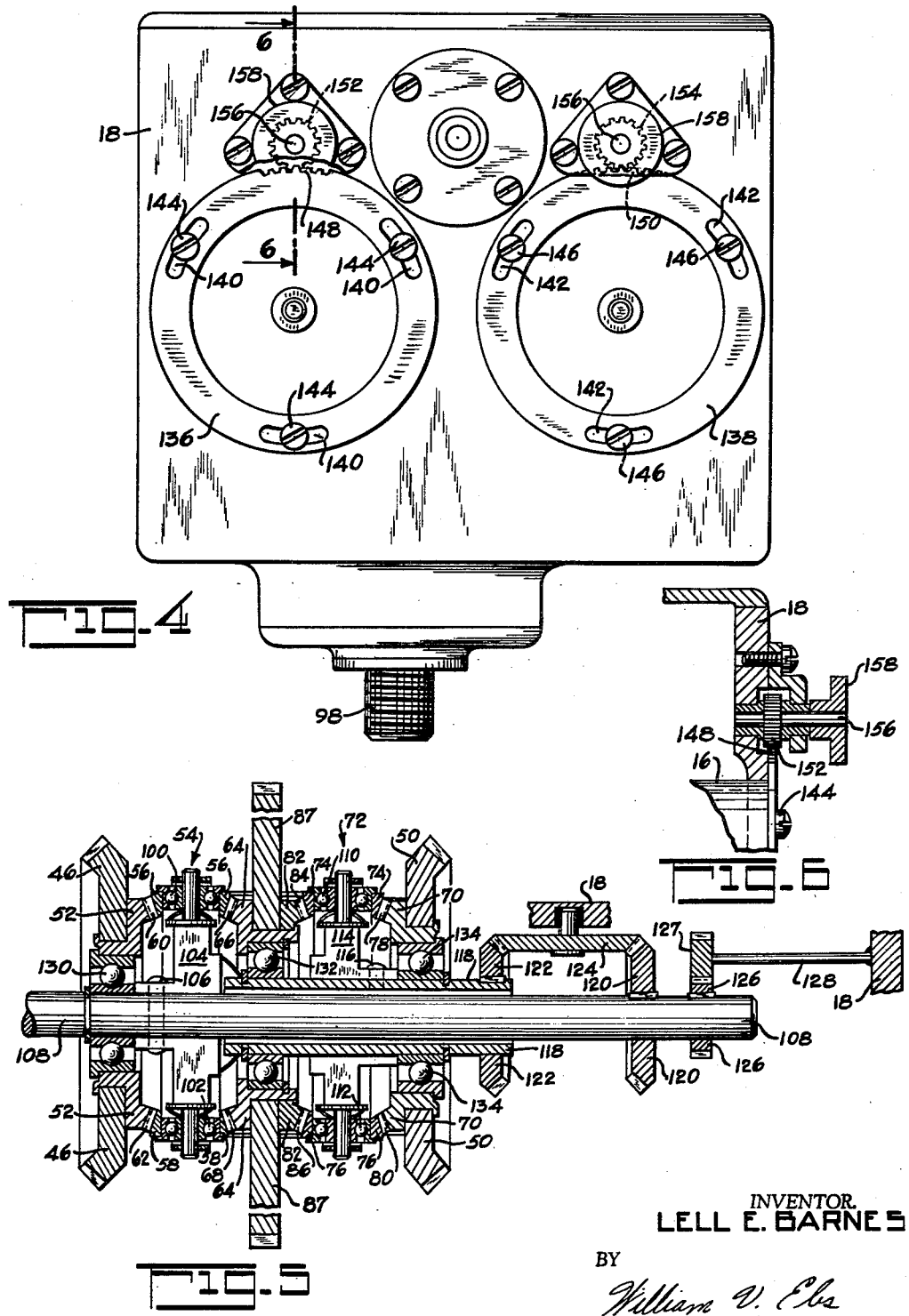

United States Patent Office 3,171,291
Patented Mar. 2, 1965

3,171,291
MECHANICAL AMPLIFIER
Leil E. Barnes, North Caldwell, N.J., assignor to Curtiss-Wright Corporation, a corporation of Delaware
Filed Aug. 17, 1962, Ser. No. 217,665
12 Claims. (Cl. 74—388)

My invention relates to mechanical amplifiers of a type having an output member which is actuated by external power in accordance with input signals to the device.

In the amplifier of the invention, an output shaft is moved with a torque and through an angle proportional to the force applied by an input element of the device to one or the other of a pair of wire bands, each of which is wrapped around a rotatable drum and has one end fixed, the other ends of the wire bands being secured to said input element. Each drum connects with a gear or ball differential and the differentials connect with a common power supply which drives the drums through the differentials in opposite directions. Spiders of the differentials connect with the output shaft which is restrained by a spring force. Tension in the wire bands wrapped on the drums is preset in the absence of an input signal to the amplifier. Such pre-established tensions are equal in the two bands, however, an input signal results in the input signal element increasing tension in one band causing such band to tighten on the drum upon which it is wrapped, whereas tension is decreased in the other band and it relaxes on the other drum. The change in torque on the drums due to the tightening and loosening of the respective bands is reflected in the differentials and as a result the spiders of said differentials are caused to turn and drive the output shaft. Such output shaft is driven with a torque proportional to the input signal and in a direction dependent upon the direction of such signal.

It is an object of the invention to provide a novel and improved all-mechanical force responsive amplifier which is operable to actuate an output shaft with a torque that is proportional to the input signal.

It is another object of the invention to provide such an amplifier which permits application of the input force signal with only slight movement of the signal applying means but having an output member which is moved a substantial amount with a torque proportional to the input force signal.

It is a further object of the invention to provide an all-mechanical force amplifier having no inherent dead zone.

Still another object of the invention is to provide a force amplifier which may be readily preset for efficient operation by adjusting the tension between two bands, each of which is wrapped around one of a pair of oppositely rotating drums.

Other objects and advantages of the invention will become apparent when taken in connection with the accompanying drawings in which:

FIG. 4 is a rear view of the apparatus of FIG. 1;

FIG. 5 is an enlarged sectional view of the gear differentials of the amplifier and FIG. 6 is a fragmentary sectional view taken on the line 6—6 of FIG. 4.

Figure 1:
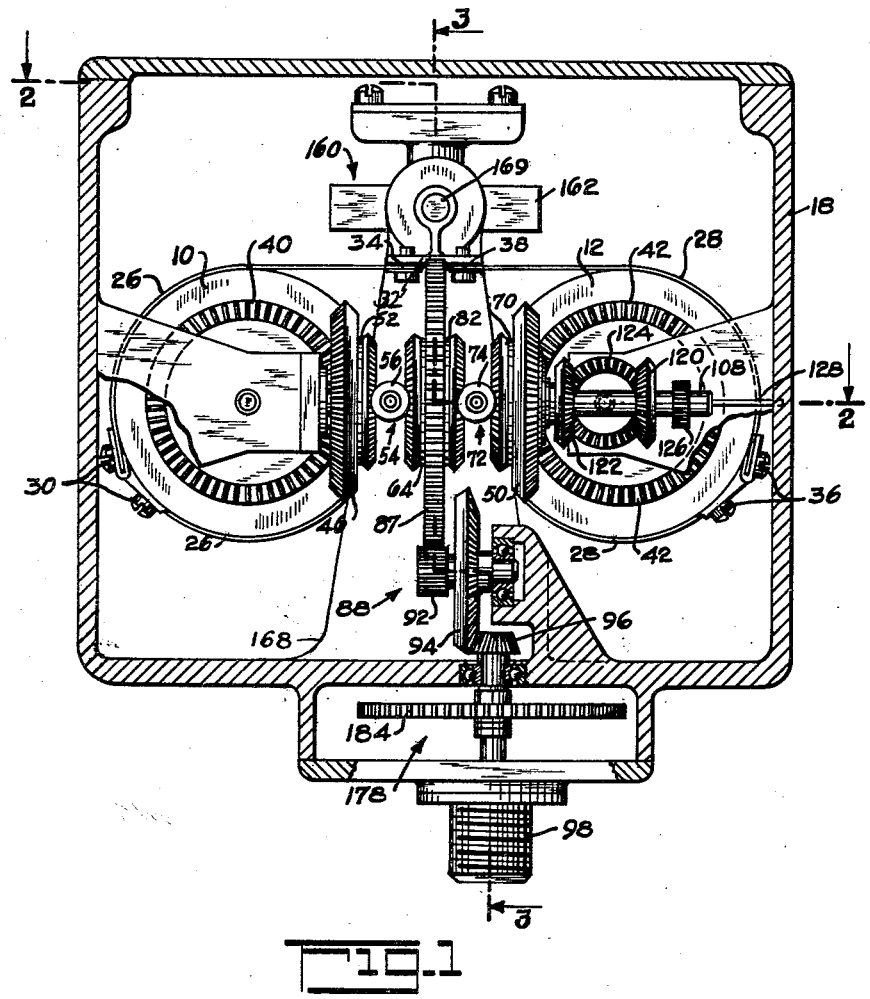
FIG. 1 is an end view of apparatus incorporating the mechanical amplifier of the invention.

Referring to the drawings, reference characters 10 and 12 designate a pair of rotatable drums which are in axial alignment with other drums 14 and 16 respectively that normally occupy fixed positions in housing 18. The rotatable drums 10 and 12 are each mounted on bearings as 20 and 22 on a shaft such as 24 which is supported at one end in housing 18 and at the other end in the axially aligned normally fixed drum. A wire band 26 is wrapped around drums 10 and 14 in a counterclockwise direction as viewed in FIG. 1, and a wire band 28 is wrapped around the drums 12 and 16 in the opposite direction. One end of band 26 is attached to normally fixed durm 14 at 30 and the other end is attached to input element 32 of the amplifier at 34. The band 28 has one end attached to the drum 16 at 36 and the other end attached to member 32 at 38.

Conical gears 40 and 42 are secured to rotatable drums 10 and 12 respectively. Gear 40 meshes at 44 with a gear 46 and gear 42 meshes at 48 with a gear 50. Secured to gear 46 is a gear 52 which is part of a bevel gear differential 54 also including gears 56 and 58 which mesh with gear 52 at 60 and 62 respectively, and gear 64 which meshes with gears 56 and 58 at 66 and 68 respectively. Secured to gear 50 is a gear 70 which is part of a bevel gear differential 72 also including gears 74 and 76 in mesh with gear 70 at 78 and 80 respectively, and gear 82 in mesh with gears 74 and 76 at 84 and 86 respectively. The gears 64 and 82 are secured to a gear 87 which connects through a gear train 88 including pinion 92, gear 94 and gear 96 with a drive shaft 98. Shaft 98 is driven continuously during operation of the amplifier and drum 10 is rotated in one direction through gear train 88, pinion 87, differential 54, gear 46 and gear 40, whereas drum 12 is rotated in the opposite direction through gear train 88, gear 87, differential 72, gear 50 and gear 42.

Gears 56 and 58 are rotatably supported by bearings 100 and 102 respectively on spider 104 which is affixed at 106 to the output shaft 108 of the amplifier, and gears 74 and 76 are rotatably supported by bearings 110 and 112 on spider 114 which is affixed at 116 to shaft 118. The shafts 108 and 118 have bevel gears 120 and 122 secured thereon, and such gears mesh with a bevel gear 124 which is rotatably mounted in housing 18. Shaft 108 also has a pinion 126 secured thereon and such pinion 126 meshes with a pinion 127 which is affixed on one end of a torsion rod 128, the rod being secured at its other end to the housing. Bearing 130 on output shaft 108, bearing 132 on shaft 118 and bearing 134 also on shaft 118 rotatably support gear 46, gear 87 and gear 50 respectively, as shown.

As mentioned hereinbefore drums 14 and 16 normally occupy fixed positions in housing 18. Such drums can however be adjusted to initially set the tension in wire bands 26 and 28 and locate member 32 between the drums as in FIGS. 1 and 2. As shown, drums 14 and 16 include flange portions 136 and 138 respectively on the outer side of the housing wall (FIG. 4). Flanged portion 136 includes a plurality of slots 140 and flange portion 138 includes a plurality of slots 142. A screw 144 extends through each of the slots 140 and is in threaded engagement with the wall of housing 18. Screws 146 extend through the slots 142 of flanged portion 138 and are in threaded engagement with the wall of housing 18. The flanged portions 136 and 138 include gear segments 148 and 150 respectively. Such gear segments 148 and 150 are engaged by pinions 152 and 154 respectively, and each such pinion is affixed to a shaft such as 156 turnable by a knob as 158 (FIG. 6). The drums are positioned to initially set the tension in the wire bands and locate member 32 by turning the knobs with the screws 144 and 146 loosened. When the drums have been positioned to preset tension in the bands and locate member 32, the screws are tightened so as to maintain drums 14 and 16 fixed relative to housing 18 during operation of the amplifier. The bands 26 and 28 apply equal restraining torques to the drums 10 and 12 respectively in accordance with the preset tension until the amplifier is actuated by an input signal. Such initial tension may be set so that restraining torque on the drums is very slight, or a greater tension may be pre-established in the bands such that a substantially greater torque is applied to the drums. Initial tension in the bands however must not be so great that a drum ceases to rotate even when tension in a band on the drum is further increased as described hereinafter by an input signal.

The amplifier which includes the drums, bands 26 and 28 thereon, gear train 88, pinion 87, differentials 54 and 72, gears 40, 42, 46 and 50, output shaft 108 and shaft 118 is shown in the drawing in association with a gyroscope 160 and drive means therefore, all being embodied in housing 18. The gimbal 162 of the gyroscope is rotatably supported by bearing 164 in the wall of housing 18 and by bearing 166 in housing structure 168. A shaft 169 having member 32 secured thereon is affixed to the gimbal 162. The gyro wheel 170 within gimbal 162 is mounted on bearings 172 and 174. Such gyro wheel is affixed on shaft 176 which drivably connects with drive shaft 98 through a gear train 178, shaft 180 and a flexible coupling 182. The coupling 182 may be of any conventional type permitting shaft 176 to tilt slightly with gimbal 162 relative to shaft 180. The gear train 178 includes gear 184 rotatable with shaft 98, pinion 186 which meshes with gear 184, gear 188 affixed to shaft 190 upon which pinion 186 is also secured, and the pinion 192 which drivably connects with shaft 180. The gyro wheel would normally be driven with drums 10 and 12 by a constant speed drive source (not shown) connected to shaft 98.

Figure 3:
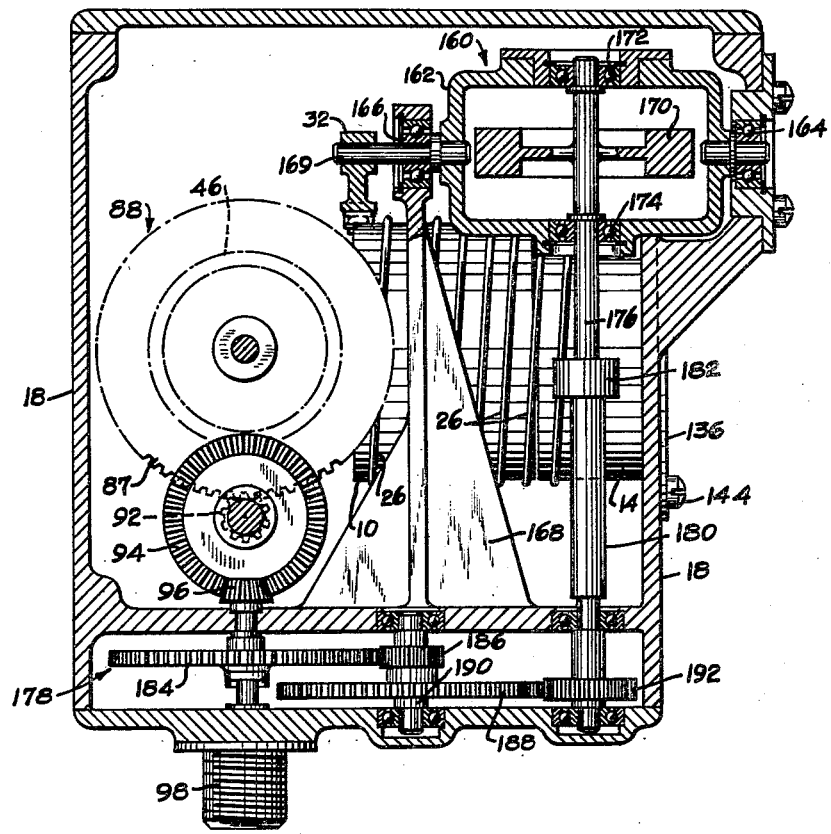
FIG. 3 is a sectional view taken along the line 3—3 of FIG. 1.

With housing 18 stationary, the position of the gimbal 162 relative to the housing is as shown in the drawings, the axis of the gyro wheel 170 being vertical as viewed, for example, in FIG. 3. When, however, housing 18 is turned such that the axis of rotation of gyro wheel 170 is caused to tilt in the plane including such axis and the axis of rotation of gimbal 162, a torque proportional to the angular rate of tilt of the axis of the gyro wheel is developed which tends to turn gimbal 162 on its axis such that member 32 on shaft 169 is urged clockwise or counterclockwise as viewed in FIG. 1, the direction in which member 32 is urged being dependent upon the direction of tilt of the housing. As indicated hereinbefore, the drums 10 and 12 are rotated in opposite directions by drive shaft 98 and the bands 26 and 28 initially exert equal restraining torques on such drums as predetermined by adjustment of the drums 14 and 16. Such equal restraining torques balance in the differentials 54 and 72 and other gears connecting drums 10 and 12 with output shaft 108 so that initially no torque is exerted on the output shaft. Such torque balance is however upset by the clockwise or counterclockwise urging the member 32.

When member 32 is urged clockwise (FIG. 1), band 26 tightens on drums 10 and 14 increasing the restraining torque on drum 10, and band 28 relaxes on drums 12 and 16 decreasing the restraining torque on drum 12. When member 32 is urged counterclockwise, band 28 tightens on drums 12 and 16 increasing restraining torque on drum 12, but relaxes on drums 10 and 14 decreasing the restraining torque on drum 10. The change in restraining torques exerted by the bands on drums 10 and 12 due to clockwise or counterclockwise urging of member 32 is reflected in differentials 54 and 72 and causes the spiders 104 and 114 acting through gears 120, 122 and 124 to exert a net turning torque (output torque) on shaft 108 proportional to the change in tension in the portions of each of the bands 26 and 28 between the drums due to the action of member 32. Shaft 108 turns in a direction depending upon whether member 32 is urged clockwise or counterclockwise by gimbal 162.

Figure 2:
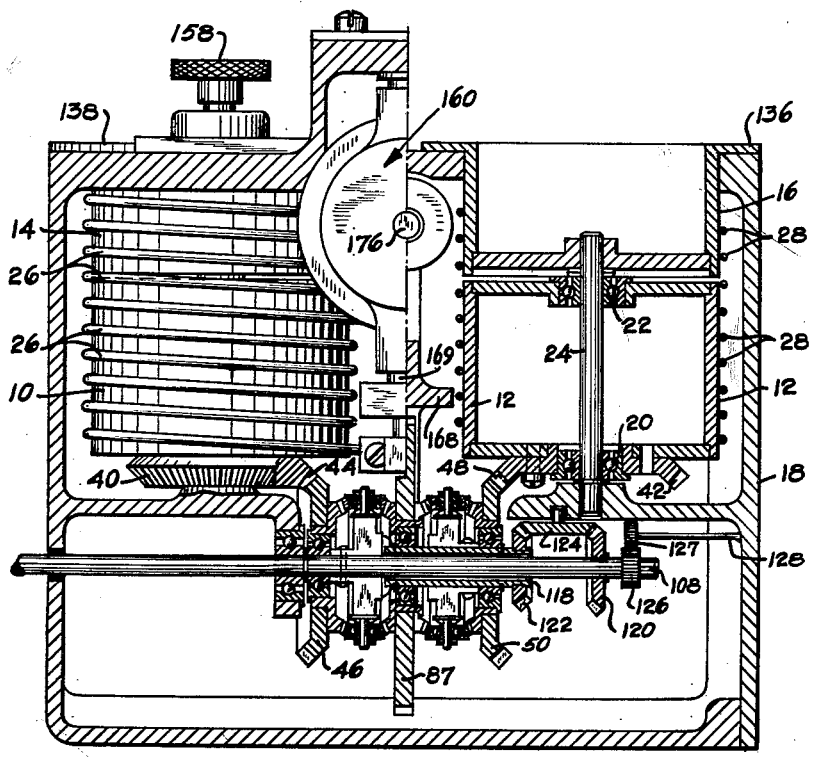
FIG. 2 is a sectional view taken along the line 2—2 of FIG. 1.

The gain of the amplifier depends on the direction of rotation of the oppositely rotating drums 10 and 12. If the drums 10 and 12 as viewed in FIG. 1 are rotated clockwise and counterclockwise respectively by drive shaft 98, substantial gain results, that is, a small input force signal at 32 results in a substantial output torque being applied to shaft 108. If, however, drum 10 is rotated counterclockwise and drum 12 is rotated clockwise, a smaller gain (ratio of the output torque to the input force signal) results. The difference in gain is due to the fact that the drums interact with the coils of wire thereon so as to markedly amplify input force signals in the former case, whereas they do not do so the latter case. Gain is dependent upon the coefficient of friction between the rotatable drums and the bands thereon when the drums are driven in the directions providing higher gain, but is substantially independent of the coefficient of friction when the drums are driven in the opposite directions.

Only very slight movements of member 32 are required to operate the amplifier. Movement of the output shaft 108 in response to a force signal applied by member 32 to the bands 26 and 28 may however be substantial in comparison. As already noted, the output shaft 108 connects through the mutually engaging pinions 126 and 127 with a torsion rod 128 which is affixed at one end to housing 18. In response to an input force signal applied by member 32 to the wire bands 26 and 28, output shaft 108 therefore turns until the net turning torque exerted thereon by spiders 104 and 114 acting through gears 120, 122 and 124 is balanced by the opposing torque which develops in rod 128, the rod being twisted as shaft 108 turns. The extent of the movement of shaft 108 is dependent upon the spring constant of the torsion rod and is proportional to the input force signal.

There is no dead zone through which member 32 must move before the amplifier is rendered responsive to an input force signal, that is, the application of any force by member 32 to the band 26 or 28 is reflected with substantially no time lag by a change in the restraining torque on each of the rotatable drums. Furthermore, the other components of the amplifier are all positively mechanically connected such that other time lags are avoided, and the output shaft is therefore actuated substantially immediately in response to the input force signal.

The amplifier can be used to drive electrical, hydraulic or mechanical devices. When the input force signal applied by member 32 to the bands 26 and 28 is small as it would be if the member is actuated by a small gyro, for example, the amplifier may be used to advantage as a preamplifier for a larger servo amplifier.

Although only one form of the invention has been shown and described it will be apparent to those skilled in the art that various changes and modifications may be made in the mechanism shown without departing from the spirit and scope of the invention. The appended claims are intended to cover all such changes and modifications.

What I claim is:

1. In combination, a pair of rotatable drums, a pair of normally fixed drums one of which is axially aligned with one of the rotatable drums and the other of which is axially aligned with the other rotatable drum, means for rotating one of the rotatable drums in one direction and the other rotatable drum in the opposite direction including a differential for each rotatable drum, a band wrapped around one rotatable drum and having one end secured to the normally fixed drum axially aligned therewith, another band wrapped around the other rotatable drum and having one end secured to the normally fixed drum axially aligned with such rotatable drum, means for adjusting the normally fixed drums to initially set tension in the bands, actuating means secured to the bands for tightening one band and loosening the other on the drums upon which the bands are wrapped, and an output shaft, the differentials each including a spider connected to the output shaft for turning the output shaft with a torque and in a direction according to the operation of the actuating means.

2. The combination of claim 1 including a member having one end secured to said output shaft and having the other end fixed for exerting a spring force in opposition to said torque as the output shaft turns.

3. In combination, a drum; a band wrapped around the drum; means secured to one end of the band for holding said one end stationary; means for actuating the other end of the band to tighten or loosen the band on the drum; an output shaft; and a differential including a spider, planetary gears mounted on the spider, a drive gear in mesh with the planetary gears, and a driven gear also in mesh with the planetary gears and driven by the planetary gears upon rotation of the drive gear, the driven gear being operatively connected to said drum for rotating the drum, and the spider being connected to the output shaft for exerting a turning torque on the output shaft dependent upon the force applied to the band.

4. The combination defined in claim 3 including spring means secured to said output shaft for opposing said turning torque.

5. The combination of claim 3 wherein the drum has a predetermined direction of rotation and the band extends around the drum toward the secured end thereof in the direction of rotation of the drum.

6. The combination of claim 3 wherein the drum has a predetermined direction of rotation and the band extends around the drum toward the secured end thereof in a direction opposite to the direction of rotation of the drum.

7. The combination of claim 3 wherein the band actuating means is a transducer operable to convert an input force signal which is other than a force to a force for application to the said other end of the band.

8. The combination of claim 7 wherein said transducer is a rate gyro.

9. The combination of claim 3 including means for initially adjusting tension in said band.

10. In combination, a pair of drums; a band wrapped around each drum; means secured to one end of each band for holding such one ends; means for applying a force signal to the other ends of the bands to tighten one of the bands while loosening the other; an output shaft; and a pair of differentials each of which includes a spider, planetary gears mounted on the spider, a drive gear in mesh with the planetary gears and a driven gear also in mesh with the planetary gears and driven thereby upon rotation of the drive gear, the driven gear of one differential being operatively connected to one drum to rotate such drum in one direction and the driven gear of the other differential being connected to the other drum to rotate the other drum in the opposite direction, and the spiders of the differentials each being connected to the output shaft for exerting a turning torque on the output shaft dependent upon said force signal.

11. The combination of claim 10 including spring means connected to said output shaft for exerting a force in opposition to said turning torque.

12. The combination of claim 10 including means for initially adjusting tension in each of said bands.

References Cited in the file of this patent
UNITED STATES PATENTS

| | | |
|---|---|---|
| 2,509,560 | Craft | May 30, 1950 |
| 2,569,586 | Small | Oct. 2, 1951 |
| 2,746,311 | Lavender | May 22, 1956 |